June 4, 1940.  H. R. PAUSIN  2,203,101
REEL FOR MOVING PICTURE FILM
Filed Feb. 25, 1939  3 Sheets-Sheet 2
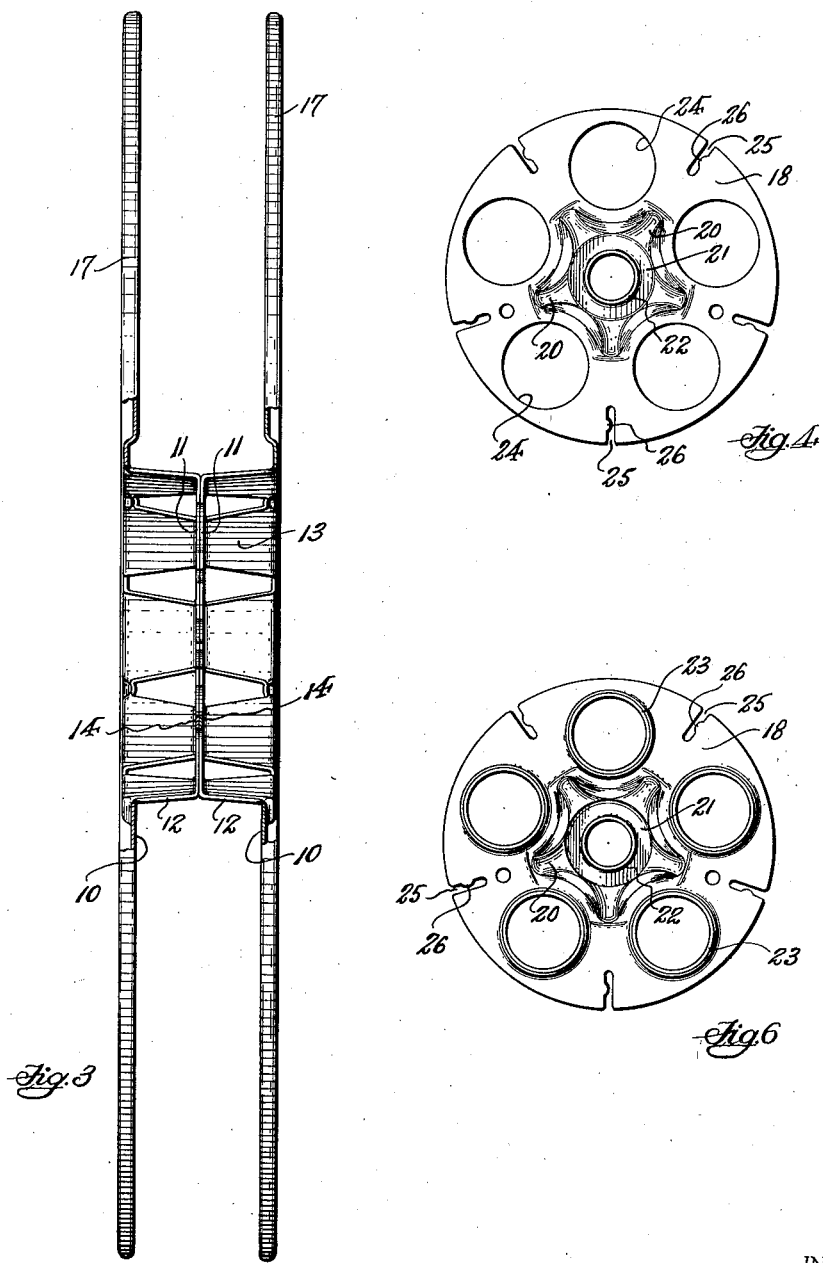
INVENTOR.
Hugo R. Pausin,
BY George D. Richards
ATTORNEY.

June 4, 1940. H. R. PAUSIN 2,203,101
REEL FOR MOVING PICTURE FILM
Filed Feb. 25, 1939 3 Sheets—Sheet 3

INVENTOR.
Hugo R. Pausin,
BY George D. Richards
ATTORNEY.

Patented June 4, 1940

2,203,101

UNITED STATES PATENT OFFICE 2,203,101

REEL FOR MOVING PICTURE FILM

Hugo R. Pausin, Maplewood, N. J.

Application February 25, 1939, Serial No. 258,361

4 Claims. (Cl. 242—70)

This invention relates to improvements in reels, and the invention has reference, more particularly, to reels for the support and manipulation of moving picture film.

The invention has for an object to provide a reel structure for the purposes mentioned comprising a novel form and assemblage of parts provided by sheet metal stampings; the various parts being so formed and devised as to strongly interlock together in assembled relation, so that the ultimate reel structure is effectively reenforced at all points in strong resistance to distortion under the stresses and strains incident to use thereof; thus providing an exceedingly strong, sturdy, true running and long lived reel, wherein all tendency to looseness or relative play between its parts is eliminated.

The invention has for another object to provide a reel structure comprising identical side plates having novel hub frame sections integral therewith and adapted to be opposed one to the other in meeting relation between the side plates, together with cooperating flanged hub plates to embrace therebetween the meeting parts of said side plate hub frame sections, said hub plates having means for joining the same together in interlocked engagement with said side plate hub frame sections.

The invention has for another object to provide a novel form of hub bushing and means to interlockingly and immovably engage the same in assembled relation to and between said hub plates.

Another object of this invention is to provide, in a reel structure as above characterized, a plurality of selectively usable film end engaging and anchoring means adapted to expedite and facilitate operative attachment of a film end to the reel.

Other objects of the invention, not at this time more particularly enumerated, will be understood from the following detailed description of the same.

Figure 1:
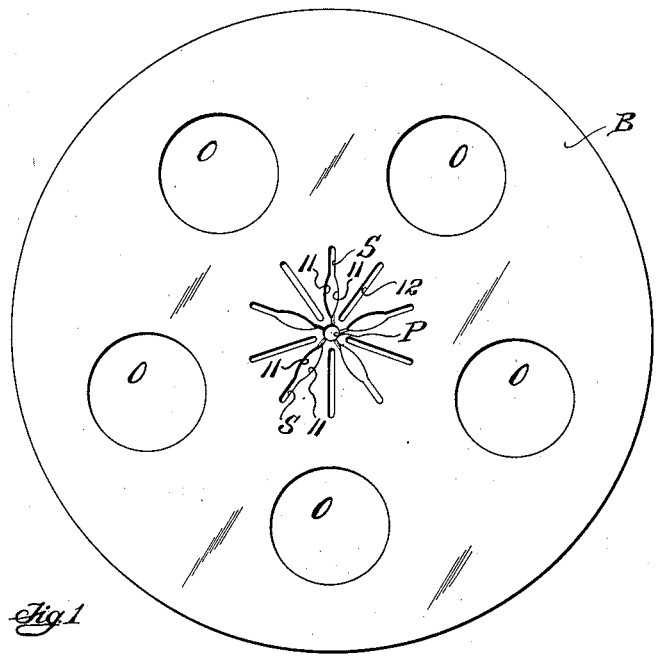
Figure 5:
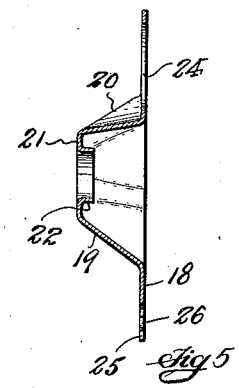
Figure 2:
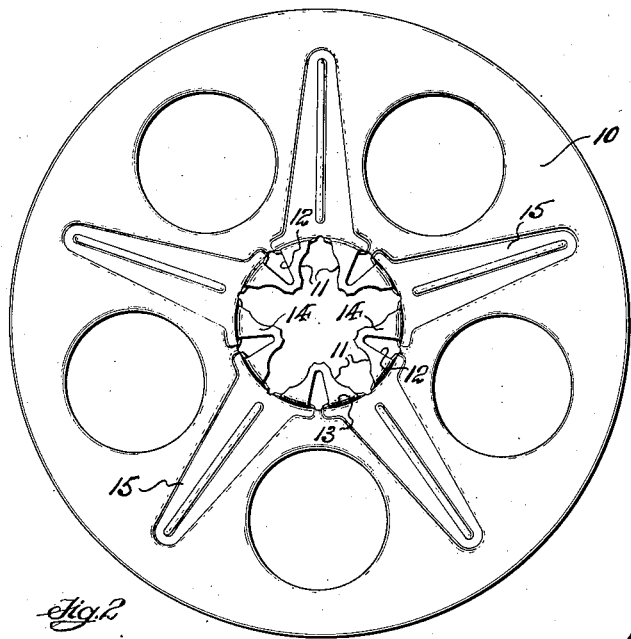
Figure 7:
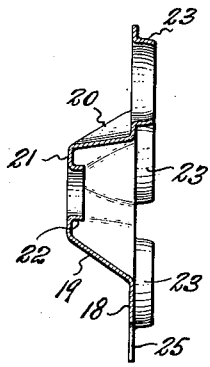
Figure 8:
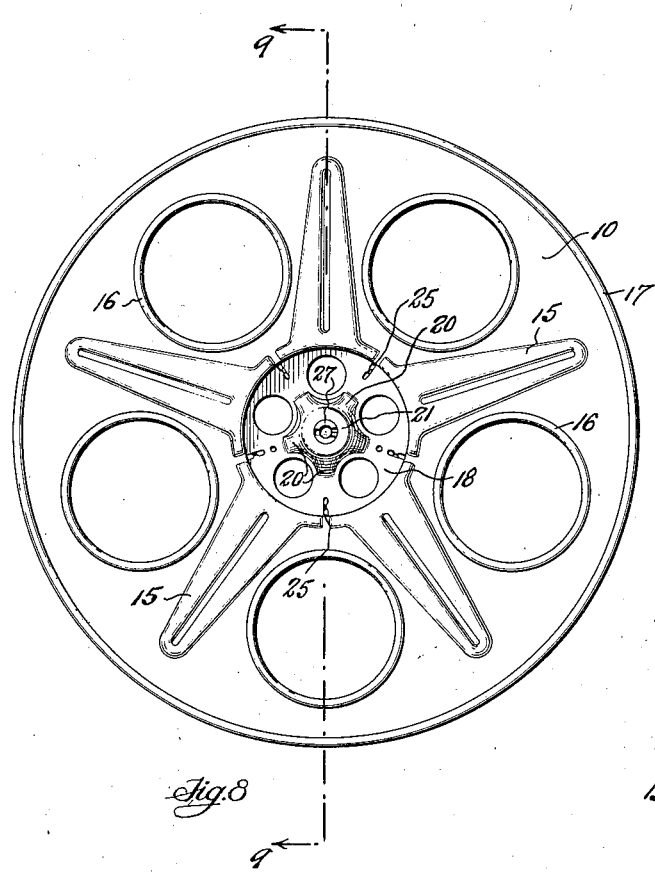
Figure 10:
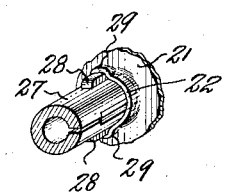
Figure 9:
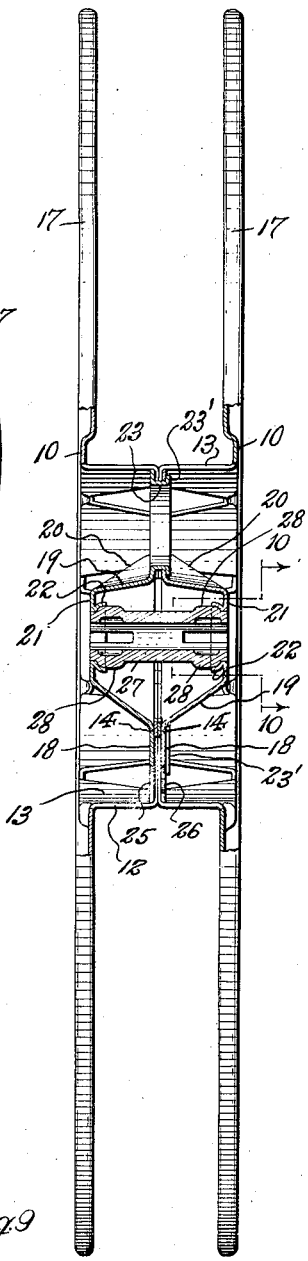

An illustrative embodiment of this invention is shown in the accompanying drawings, in which:

Fig. 1 is a plan view of a blank from which a side plate of the novel reel of this invention is to be formed; Fig. 2 is an inside face view of a side plate formed from the blank of Fig. 1; Fig. 3 is in part an edge elevation and in part a vertical sectional view of a pair of the side plates of Fig. 2 arranged in reel forming relation, this view being drawn on an enlarged scale; Figs. 4 and 6 are respectively inside face views of the respective cooperating hub plates of the novel reel; Figs. 5 and 7 are respectively vertical sectional views of said respective hub plates; Fig. 8 is a side elevation of the complete reel; Fig. 9 is a vertical sectional view of the complete reel, taken on line 9—9 in Fig. 8, but drawn on an enlarged scale; and Fig. 10 is a fragmentary perspective view in part section and taken on line 10—10 in Fig. 9 to show the interlocked assembled relation of the hub bushing and hub plate structure.

Similar characters of reference are employed in the above described views, to indicate corresponding parts.

The side plates 10 of the reel are each formed out of a circular blank B of sheet metal, such as shown in Fig. 1. The blank B is provided with a plurality of suitably spaced openings O to lighten the same. At its center, the blank B is provided with a perforation P from which outwardly extend a plurality of suitably spaced radial slits S having properly positioned, along opposite side margins thereof, arcuate portions 11. The blank B is further provided, intermediate the slits S, so as to occupy alternated equi-spaced relation thereto, with a plurality of radial slots 12.

When a side plate 10 is formed from the sheet metal blank B above described, the central slitted and slotted area of the blank is expanded and pressed outwardly therefrom so as to form an annular inwardly offset hub frame section integral therewith. When forming said hub frame section, the slits S are laterally expanded, and the areas of the metal blank bounded thereby are so shaped as to form their inner portions into an annular wall 13 substantially perpendicular to the plane of the side plate, while, at the same time, bending the free end portions of said areas into an end wall 14 disposed in an inwardly offset plane parallel to the plane of the side plate. The expanding or spreading apart of the opposite margins of the slits S, as above described, spaces the opposed arcuate portions 11 thereof so as to define circular receiving openings in and properly spaced around the extent of said end wall 14. When the hub frame section is formed, the slots 12 are likewise expanded laterally to provide film end passages for purposes subsequently set forth herein.

The pre-slitting of the central portion of the blanks B permits the formation of the hub frame sections without necessity for unduly stretching the metal with likelihood of fracturing the same with resultant spoilage and waste in the process of manufacture.

In the formation of the side plate 10 from the blank B, symmetrically spaced reenforcing or stiffening ribs 15 of suitable conformation are also struck out from the body of the blank to extend radially outward from the hub frame section. To further finish and stiffen the side plate 10, the margins of the openings O are turned to provide the latter with beaded edge portions 16; and, likewise, the external peripheral portion of the blank is also turned to form a finishing and stiffening peripheral bead 17.

In the make-up of the reel of this invention, two substantially similar hub plates are employed, each comprising a circular disc-like body portion 18 of a diameter adapted to fit within the interior of the hub frame section of a side plate. Struck outwardly from the body portion 18 is a centrally disposed hollow hub member or boss 19, the side walls of which are preferably provided with outwardly pressed stiffening rib portions 20. The hub member or boss 19 terminates at its outer end in a perforate end wall 21, the opening of which is bounded by an inwardly projecting annular collar flange 22. One of said hub plates is provided with suitably spaced openings bounded by annular rivet flanges 23 disposed to project laterally from the inner face thereof. The other of said hub plates is provided with correspondingly spaced openings 24 sized to admit therethrough the annular rivet flanges 23 of the first mentioned hub plate. Both hub plates are provided in their free marginal portions with a plurality of correspondingly located indenting radially extending film end receiving slots 25 spaced around the circumference thereof. One margin of each said receiving slot 25 is provided with a gripper lug 26 to project toward the opposite margin thereof.

The reference character 27 indicates a cylindrical tubular hub bushing. Said bushing is provided at each end portion with diametrically disposed outwardly and oppositely projecting lock key lugs 28.

In assembling the above described parts from which the novel reel structure of this invention is made up, two side plates 10 are brought together with their inwardly projecting hub frame sections opposed so that their end walls 14 abut in meeting relation, as shown in Fig. 3. The abutting hub frame sections are so disposed that the expanded slit portions S and slots 12 are in register, thus matching the arcuate portions 11 of the former so as to define a plurality of receiving openings through the meeting end walls 14 of said hub frame sections. When a pair of side plates 10 are thus relatively positioned, one hub plate is inserted within the exteriorly open hollow interior of the hub frame of one side plate 10, so that its inner face abuts the exterior side of the hub frame end wall 14 of the latter, and so that the plurality of openings of the body portion 18 of the inserted hub plate match or register with the respective corresponding openings defined by the arcuate portions 11 of the abutting hub frame end walls 14. In like manner, the other hub plate is inserted within the hub frame of the opposite side plate 10. The rivet flanges 23, with which the body portion of one of the hub plates is provided, will extend through the corresponding openings defined by the arcuate portions 11 of the abutting hub frame end walls 14, and will thence pass outwardly through the openings 24 of the body portion 18 of the other hub plate, whereupon these rivet flanges 23 are riveted over and around the marginal portions of said openings 24, as at 23', thus securely and strongly joining the described assemblage into united reel forming relation.

When assembing the side plates 10 and hub plates 18 together in the manner above described, the hub bushing 27 is also positioned to extend through and between the opposed hub members or bosses 19 of the hub plates, so that as the latter are forced home into the hub frame sections of the side plates, and toward each other, the end portions of said hub bushing 27 will enter the openings of the hub members or bosses 19, while at the same time the lock key lugs 28, at the respective ends of the hub bushing, will be pressed into the collar flanges 22 which surround said openings. In thus entering said flanges 22, the lock key lugs 28 will deform the same so as to provide cooperative female lock portions 29 to embracingly surround and conform to said lock keys 28 (see Fig. 10). Thus the hub bushing is immovably and non-rotatably affixed to and between the hub members or bosses 19 of the hub plates.

When the parts of the reel are assembled in the manner and relations described, the slots 12 will be aligned respectively with the outwardly open radial receiving slots 25 provided in the marginal portions of the body portions 18 of the hub plates, thus leaving said slots readily accessible for the insertion of a film end desired to be thus attached to the reel for winding thereon. It will be obvious that the provision of the plurality of selectively usable film end attaching or coupling slots 25, as circumferentially spaced around the hub structure, is of great convenience, since it reduces the necessity of turning the reel to a given position in search for and then to gain access to the film end attaching means. As a consequence of this the operation of attaching film to the reel is facilitated and time is saved. Furthermore, since in the assembling of the hub plates the gripper lug 26 of a receiving slot 25 of one hub plate will be disposed to oppose the gripper lug of the cooperating receiving slot of the other hub plate, when the film end is inserted the same will be snubbed or effectively gripped, so as to be efficiently held against detachment, until a few windings of the film upon the reel positively assures against accidental detachment of the film end therefrom.

From the above description it will be obvious that a very sturdy and durable true running film reel structure is provided by the instant invention, and one in which the make up thereof requires the use of no separate fastening elements of any kind. The novel form of the hub frame sections formed integrally with the side plates and arranged in meeting relation so as to be strongly clamped between and rigidly interlocked together with the hub plates by the plurality of annularly spaced interlocking rivet flanges 23, provides the reel with an exceptionally strong central structure, wherein all associated parts are mutually interlocked together in such manner as to offer exceptional resistance to distorting stresses and strains.

I am aware that various changes could be made in the reel structure above described and as shown in the accompanying drawings, and many apparently widely different embodiments of this invention could be made without departing from the scope thereof as defined by the following claims. It is therefore intended that all matter contained in the above description or shown in the accompanying drawings shall be interpreted as illustrative and not in a limiting sense.

I claim:

1. A reel comprising, a pair of side plates having integral hollow hub frame sections centrally projecting from their inner faces, the ends of said hub frame sections being abutted in meeting relation to thereby space apart said side plates, said hub frame sections comprising circumferentially spaced inwardly extending portions bent radially at their inner ends to provide separated radially converging end wall forming parts having terminal portions to bound and define central hub frame section openings, side margins of adjacent end wall forming parts having opposed arcuate portions to provide riveting collar receiving openings intermediate said end wall forming parts, hub plates respectively seated within the hollow interiors of said hub frame sections to embrace therebetween the meeting end wall parts of the latter, one said hub plate having integral annular riveting collars projecting from its inner face through said receiving openings intermediate said hub section end wall forming parts, the other hub plate having corresponding openings to receive said riveting collars, the latter being riveted over said last mentioned hub plate to interlock together the side plates and hub plates in operative assembled relation, said hub plates having central hub bosses to project outwardly within the interiors of said hub frame sections, and a hub bushing affixed to and extending between said hub bosses.

2. A reel as defined by claim 1, wherein said hub frame sections are provided with aligned slots formed to extend through their inwardly extending portions, and said hub plates are provided with slots radially indenting their circumferential marginal portions and aligned in registration with said first mentioned slots, whereby to provide the reel structure with a plurality of selectively usable film end receiving and engaging means.

3. In a reel as defined by claim 1, wherein said hub plate bosses are provided with central openings bounded by projected annular flanges to receive the ends of said hub bushing, and wherein said hub bushing ends and said flanges are provided with radially disposed cooperating male and female means for interlocking said hub bushing in affixed relation to said hub plates against rotative displacement.

4. A blank from which a side plate of a reel of the kind described may be produced comprising, a substantially circular sheet metal disc having a central perforation and slits extending radially outward therefrom to define separated radially disposed parts capable of being bent and formed, without undue stretch, strain or risk of fracture, into a hollow hub frame section, and side margins of adjacent parts having opposed arcuate portions, to define and bound riveting collar receiving openings to be provided in the ultimately formed hollow hub frame section.

HUGO R. PAUSIN.